G. W. Nevill,
Excavator.
No. 99,102.            Patented Jan. 25, 1870.
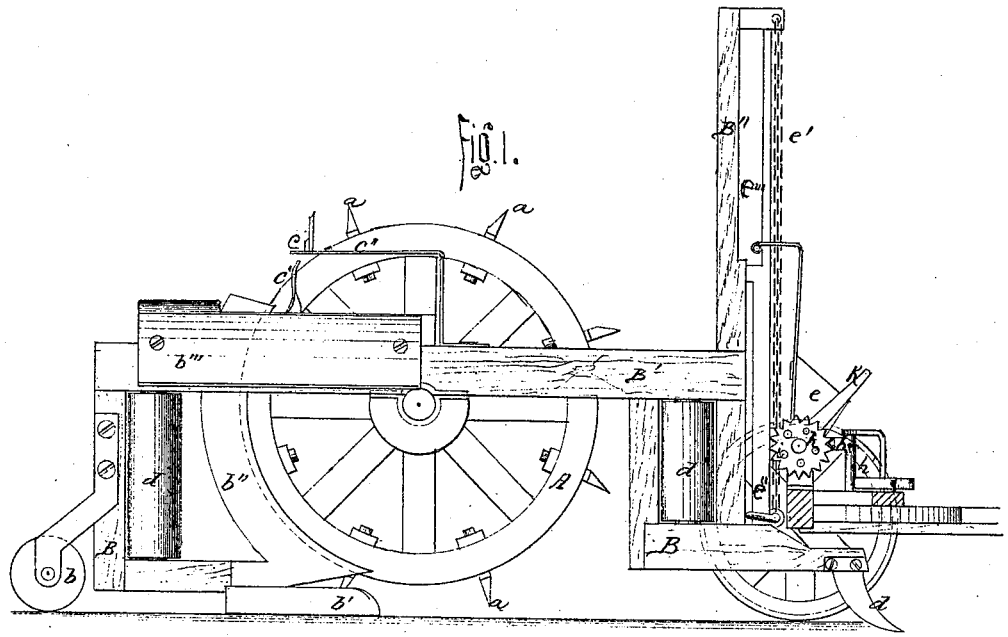
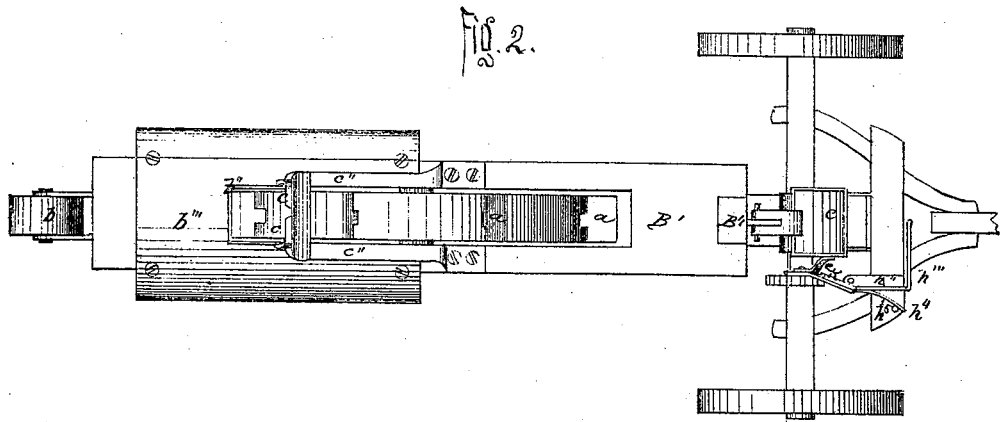
Witnesses:
C. A. Pettit
Wm. R. Robinson
Inventor:
G. W. Nevill
by Munn & Co.
Attorneys.

United States Patent Office.

G. W. NEVILL, OF RICHMOND, VIRGINIA.

Letters Patent No. 99,102, dated January 25, 1870.

IMPROVEMENT IN DITCHING-MACHINE.

The Schedule referred to in these Letters Patent and making part of the same.

*To all whom it may concern:*

Be it known that I, G. W. NEVILL, of Richmond, in the county of Henrico, and State of Virginia, have invented a new and useful Improvement in Ditchers; and I do hereby declare that the following is a full, clear, and exact description of the construction and operation of the same, reference being had to the accompanying drawings, making a part of this specification, in which—

Figure 1 is a side elevation, and
Figure 2 is a plan view.

This invention relates to a ditching-wheel, supported in a frame, the latter being mounted on wheels for purposes of locomotion; and the invention consists in attaching to the said frame certain elastic scrapers, for cleaning the cutter-teeth; also, in providing that part of said frame which moves in the earth below the surface, with vertical rollers, wider than the cutter-wheel and frame, and narrower than the scoop which forms the bottom of the ditch, and placed both before and behind the wheel, so that the sides of the ditch may not come in contact with the sides of the wheel, and frame; also, in certain novel apparatus for raising and lowering the cutter-wheel; also, in a peculiar apparatus for disposing of the earth removed by the cutters; and finally, in providing coulters for cutting the sides of the ditch, that shall also serve as protectors of the cutters following.

In the drawings—

A represents the cutter-wheel, armed at its periphery with a sufficient number of cutters $a$.

The wheel A is supported in a frame, B B', that is mounted in front upon an axle and pair of wheels, and at the rear upon a caster-wheel, $b$.

Opposite the lower point to which the cutters come in their revolutions, a scoop, $b'$, is attached to the frame, and serves as a receptacle into which the cutters $a$ first sweep their earth.

From the scoop $b'$, a spout, $b''$, leads to the upper part of the frame, up which spout the cutters carry the earth, which, arrived at the top of the spout, falls over its sides, and upon aprons $b'''$ sloping to each side, and slides off them to the ground, clear of the machine.

In order to keep the rim of the wheel clean, I make use of scrapers $c'$, one on each side of the wheel, and extending nearly across its rim.

The scrapers are fastened to the sides of the top piece B', by elastic arms, that yield when the cutter-teeth pass between them, and then immediately close again.

The teeth are kept clean by means of a scraper, $c$, which lies across the rim of the wheel, and is connected, by elastic arms $c''$, one on each side the wheel, with the top piece B', said arms being bent at a right angle so as to bring the teeth against the edge of the scraper, and $c''$ being of sufficient length to meet the teeth while they are yet inclined outward, whereby the scraper rises upon their inner edges as upon an inclined plane, and falls over their sloping rear surfaces, the instant they have passed.

The lower front part of the frame B, beneath the forward axle, has a pair of coulters, $d$, for cutting the sides of the ditch, projecting from it, placed at a distance apart less than the width of the rim of the wheel, thereby catching any obstruction that would not pass up the spout, and enabling it to be removed before damaging the machine.

I also provide in the frame B, and beneath the top piece B', two vertical rollers $d'\ d'$, one in front and the other in rear of the wheel, and of a diameter greater than the width of the rim and frame, and less than the width of the scoop at the bottom, thereby enabling the wheel and frame to traverse the ditch without touching its sides.

Upon the upper side of the front axle I mount a windlass, $e$, in some suitable place, as beneath the driver's seat, fastened to the surface of the windlass on the ends of two chains $e'\ e''$, the other ends of which are attached respectively to the upper and lower extremities of a metallic bar, $e'''$, that stands out from the front post B'' of the frame. These chains are the means by which the frame B is connected with the front axle, and as the windlass is rotated in one direction or the other, the frame is by the chains raised or lowered.

A staple, $m$, projects backward from the forward axle, through which staple the bar $e'''$ passes, the staple and bar acting together to draw the machine.

A shaft projects from one end of the windlass, having a toothed wheel, $h$, upon its outer extremity.

In front of the toothed wheel, a swivelling vertical post, $h'$, is mounted in a suitable frame, and has a spur, $h''$, projecting from it, long enough to enter between the teeth of the wheel $h$ and hold the latter stationary.

From the lower end of the swivelling-post projects a bent arm, $h'''$, by means of which the prong $h''$ may be moved clear of the toothed wheel.

A spring-plate, $h^4$, attached to the side of the arm $h''$, and bearing against the pin $h^5$, serves to press the arm in the direction required to keep the spur $a''$ engaged with wheel $h$.

This wheel has a circular row of holes, $i$, made through it, in which holes a pin upon the outer side of the lever $k$ may enter, said lever being placed loosely on the shaft of the windlass, so that when its pin has been inserted in one of the holes, and the wheel $h$ rotated as far as the driver can conveniently do it, then he may withdraw the pin from the hole $i$ that it may be in, and swing the lever forward as far as he wishes, and again insert the pin, and give the wheel *h* another turn. This process may be repeated to any length.

A spring-plate, *k'*, tends to keep the lever pressed against the wheel.

Having thus described my invention,

What I claim as new, and desire to secure by Letters Patent, is—

1. The scoop *b*, combined with the spout *b''*, and the aprons *b'''*, in the manner and for the purpose specified.

2. The scrapers *c c'*, with their elastic arms, constructed and operating substantially as described.

3. The rollers *d'*, made wider than the rim of the cutter-wheel and narrower than the ditch at the bottom, and applied to the frame B, substantially as set forth.

4. The toothed wheel *h*, combined with the swivelling-post *h'*, provided with the spur *h''*, the bent arm *h'''*, spring-plate *h''''*, and pin *h'''''*, as and to the end explained.

5. The wheel *h*, provided with the holes *i*, and combined with the swivelling-lever *k*, the latter having a pin, and the spring-plate *k'*, substantially as specified.

To the above specification of my invention, I have signed my hand, this 2d day of July, 1869.

G. W. NEVILL.

Witnesses:
 CHAS. A. PETTIT,
 SOLON C. KEMON.